UNITED STATES PATENT OFFICE.

THOMAS J. DELANY AND WILLIAM W. JAMESON, OF KANSAS CITY, MO.

PREPARING YEAST.

SPECIFICATION forming part of Letters Patent No. 287,367, dated October 23, 1883.

Application filed February 7, 1883. (No specimens.)

*To all whom it may concern:*

Be it known that we, T. J. DELANY, and W. W. JAMESON, citizens of the United States, residing at Kansas City, county of Jackson, in the State of Missouri, have invented a new and useful composition of matter to be used for the purpose of raising flour in the making and manufacture of bread and biscuit in all of its forms, to be used for food, of which the following is a specification.

Our composition consists of the following ingredients combined in the proportions stated, viz: Our novel ingredient is life-everlasting, or mouse-ear, an herb botanically named *Gnaphalium polycephalum, Gnaphalium margaritaceum*, which we combine as follows: rye or wheat flour, one pound; cornmeal, one-half pound; flowers of gnaphalium, one and one-half ounce; pure water, one gallon. Steep the flowers of gnaphalium in the gallon of water for one hour or more; then strain off the decoction so made, so as to separate therefrom the herb; then scald the flour and meal by pouring thereon a small quantity of boiling water; then place the same in a tub or hollow vessel, and pour over and thoroughly stir and mix the decoction with such scalded meal and flour, letting the mixture stand in a room, the temperature of which should be about 70° Fahrenheit, for twelve hours or more, for the purpose of fermentation. After it has sufficiently fermented, pour the whole into a kneading-trough or other convenient receptacle, and add stock—that is equal parts of cornmeal and flour (rye or wheat)—to make it of sufficient consistence to be rolled and molded into cakes. Then roll, cut, and dry the same, and it is fit for use. The quantity of the flowers of gnaphalium to be steeped and treated as aforesaid may be increased or diminished, depending on the strength and quality of the herb, while the extract thereof may be used in place of the steeped decoction, and the whole composition of matter may be increased in the same proportions to any desirable amount for manufacturing purposes. In using the above and foregoing composition of matter, first prepare flour by mixing it with water or other liquid substance appropriate for such purpose, composing what is commonly called "sponge," and after so preparing any desirable amount of flour, put into it a suitable amount of such composition of matter, first softening the hard cakes by soaking the same in a small quantity of warm water. It is then to be handled, managed, prepared and baked as ordinary bread, biscuit, or any preparation thereof for food or sustenance. This composition of matter makes a superior yeast to any other composition of matter heretofore known or used, retaining its excellent qualities both on the land and on the sea, resisting all changes of temperature and climate, retaining its strength and life-giving properties long after all other preparations or compounds or compositions of matter of a similar character have become dead and worthless.

We are aware that an indefinite amount of substances have been combined and compounded and used in common and general use from time immemorial, composing what is known in general terms as "yeast," "yeast-cakes," and "yeast-powder;" but we are not aware that all of the ingredients of our composition, in the proportions stated, have ever been used together.

What we claim, and desire to secure by Letters Patent of the United States, is—

The herein-described composition of matter to be used as a yeast in all preparations of bread-making and in all of its forms and by whatever name called wherein yeast is used as a component part, consisting of the extracted properties of the herb known as "life-everlasting" or "mouse-ear," or by whatever other name called or known, added to, fermented, and mixed with cornmeal, wheat, or rye flour and pure water in the proportions specified.

THOMAS J. DELANY.
WILLIAM W. JAMESON.

Witnesses:
C. J. BOWER,
C. W. PARSONS.